United States Patent [19]
Bauer et al.

[11] 4,081,204
[45] Mar. 28, 1978

[54] BALL BEARINGS AND BALL RACES

[75] Inventors: Rudolf Bauer, Herzogenaurach; Dieter Goppelt, Aurachtal; Hans-Christian Krüger; Max Pfitscher, both of Herzogenaurach, all of Germany

[73] Assignee: Industriewerk Schaeffler OHG, Herzogenaurach, Germany

[21] Appl. No.: 677,037

[22] Filed: Apr. 14, 1976

[30] Foreign Application Priority Data

Apr. 24, 1975 Germany .......................... 2518129

[51] Int. Cl.² .......................................... F16C 33/58
[52] U.S. Cl. .............................. 308/216; 29/148.4 R
[58] Field of Search ............ 308/201, 188, 216, 217, 308/235; 29/148.4 R

[56] References Cited

U.S. PATENT DOCUMENTS

| 3,628,838 | 12/1971 | Camosso | 308/216 X |
| 3,937,541 | 2/1976 | Alling et al. | 308/235 |

*Primary Examiner*—Joseph F. Peters, Jr.
*Assistant Examiner*—Gene A. Church
*Attorney, Agent, or Firm*—Hammond & Littell

[57] ABSTRACT

A thin-walled race for a radical ball bearing and a thin-walled race sheave for an axial ball bearing as well as ball bearings containing said races or thrust washers and a method for producing said races and thrust washers and apparatus for the production of said races and thrust washers and assembly of said bearings.

29 Claims, 25 Drawing Figures

BALL BEARINGS AND BALL RACES

STATE OF THE ART

Ball bearings with thin-walled races or thrust washers produced by non-cutting shaping from sheet metal are already known in various embodiments. Thus, constructions are known where the balls roll directly on plane surfaces of a metal part which bears, on the other hand, in a housing bore or on a shaft. The balls, which absorb the bearing load to be transmitted, bear at one point on each race. For the lateral guidance of the balls, the thin-walled metal races are folded over, for example, at their ends, so that an extremely low end border is provided which can easily lead to jamming of the balls when axial loads have to be absorbed in such bearings.

In another known bearing, this disadvantage of the low end border height has been eliminated by toroid hollow profiles on the races against which the balls can strike axially. However, the actual rolling of the balls also takes place in this embodiment on the thin metal part between these end borders. Each of the races is formed in this construction of two superposed metal parts, so that a thickness of the wall is doubled in the area of the ball raceway and the object of this construction is to permit narrowing the axial bearing play by displacing the two superposed metal parts so far toward each other that they bear practically free from play against the balls with the toroid hollow profiles. A disadvantage of this embodiment is that this freedom from play is not positively maintained in operation, but can get lost by the fact that the two metal parts move apart again.

In all these known cases, there is the disadvantage that the ball rolls directly on a thin-walled metal part which bears, on the other hand, directly on another part, e.g. a housing bore or a shaft. Due to this, there is a great danger, particularly in the shaft rings, that they will "roll on" which leads to an increase of the diameter caused by the fact that the thin-walled race is subjected to a true rolling process between the balls, on the one hand, and the seat of the ring, e.g. the shaft, on the other hand, without having the possibility of yielding elastically.

OBJECTS OF THE INVENTION

It is an object of the invention to provide races or thrust washers for ball bearings which avoid the disadvantages of the prior art and particularly are not subject to the risk of "rolling on" and bearings containing the same.

It is another object of the invention to provide a novel simple process for the production of said races or thrust washers for ball bearings.

It is a further object of the invention to provide a novel apparatus for the production of the races or thrust washers for the ball bearings.

These and other objects and advantages of the invention will become obvious from the following detailed description.

THE INVENTION

The novel thin-walled races of the invention for radial ball bearings are comprised of a singular thin-walled tubular element having on at least one axial end a rolled head with a substantially circular outer contour on which the balls of the bearing will roll. The thrust washers of the invention for axial ball bearings are comprised of a ring shaped metal plate having at its two edges rolled beads with a substantially circular outer contour on which the balls will roll.

The races or thrust washers of the invention are easily producible without the risk of "roll on" and are sufficiently deformable in the manufacture and assembly of the bearing that a ball bearing with an exactly defined bearing play is produced. The fact that the balls roll on these races and thrust washers on the rolled-in beads ensures that these beads do not tend to "roll on" and the dimensions of these races and thrush washers remain thus practically completely unchanged, even under load, as long as the load limits provided for the bearing are not exceeded.

Another advantage of the races of the invention is that the bearing play can be adjusted with extreme accuracy depending on the extent to which the beads are rolled in without the plate wall thickness, for example, having any effect as in the known bearings.

According to a preferred embodiment of the invention, a thin-walled race of the invention is provided at both axial ends with beads whose mutual distance is to be adapted to the ball diameter so that the balls are exclusively in contact with the bead surfaces. Such a ring can furthermore be so designed that the two beads have different diameters. This can be of advantage if one race is to project in a finished bearing on one side, for example, axially over the bearing. But it should be kept in mind that with different bead diameters at both ends of a race, the contact point between the beads and the balls are likewise displaced and in this way, it is possible to obtain an adaptation to different axial components in both axial directions.

To impart good raceway properties to the beads, these can be finished in the area in which the balls roll on them by non-cutting shaping, for example, by smooth rolling or by cutting shaping, for example, by turning or grinding. If the elasticity of the hollow beads seems too great in individual applications, a wire ring can be rolled into the bead whereby the bead cross-section is almost completely filled with the material. A similar effect can be achieved by rolling the beads in several turns in the form of a spiral whereby the bead cross-section is likewise almost completely filled by the material.

In individual cases, a race of the invention can be provided at one end with a bead while it is provided at the other end with a closed bottom or with a flange radially extending to the outside. Since in this case the second bead must be eliminated, the ball raceway must be replaced by another face part. To this end, it is advisable to provide at the transition point from the tubular part to the bottom or flange, a conical surface on which the balls roll. Another simple variant of the race of the invention consists in deforming the area of the tubular part adjoining the bead so that the surface away from the beads has a convex contour. The race can thus easily perform a slight adjusting movement relative to its seat to compensate, for example, for shaft saggings or shaft alignment errors.

Various types of radial ball bearings can be obtained from such thin-walled ball bearing races produced by non-cutting shaping. In the simplest case, an outer race with radially inwardly directed beads is joined with an inner race with radially outwardly directed beads to form a unit, with balls interposed there between. One or the other race produced by non-cutting shaping can be replaced by a solid race without giving up any of the advantages of the races produced by non-cutting shaping. Likewise an outer race produced by non-cutting shaping can be combined with a shaft provided with a groove for the ball.

The balls can be arranged in these bearings in a simple manner in a cage which is designed as a simple cylindrical sleeve guided at least at one end on the beads of the races. If the dimensions of the cage are to be adapted to the races so that it engages the beads of the two races with very little radial play, the remaining narrow gaps can act as sealing gaps so that additional sealing of the bearing is not necessary. But the cage can also be designed as a plastic part and bear in its end regions against the beads of the inner and outer race to form a sliding seal under initial stress.

Another simple possibility of sealing the bearing without additional parts consists in dimensioning the beads on the inner and outer race so that they are separated from each other only by a narrow sealing gap. A variant of the above described cage consists in designing it as a flat disk with radially directed webs extending between successive balls.

In those cases where an annular gap exists between the beads of the outer and inner race, the sealing of such a bearing can be achieved so that this annular gap is bridged over by a ring-shaped part which is secured on the bead at one race and cooperates sealingly with the opposite bead of the other race. This part can form with the second bead a sliding seal but also a contact-free sealing gap.

Finally a double-row ball bearing can be formed in a very simple and expedient manner by using a race of the invention where the two races can swing to a certain extent toward each other. To this end, an inner race with two spaced ball races is used in which the rows of balls roll and to this inner race is assigned a thin-walled outer race with beads at both ends, the balls of each row of balls touching only one bead of the outer race.

When using the above described thrust washers for the production of an axial ball bearing, care must be taken that the two beads on such a thrust washers are of different size so that their contact points with a ball extend on a straight line which intersects the bearing axis in the center of the bearing. Such a design provides perfect kinematic conditions for the rolling of the balls. The various possibilities of the constructional design described above in connection with radial ball bearings can be applied at least partly to axial ball bearings.

The production of the above described races is possible by the invention in a very simple manner wherein a thin-walled tubular part is placed between a matrix and a die which are moved in the axial direction toward each other, the tubular part coming in contact at its axial ends with parts of the matrix and die which effect the rolling of the material of the tubular part to beads. For the complete formation of a race starting from a tubular part, it is thus only necessary to subject this part to a simple tool movement on which neither rotating or moving parts are provided and in this one operation, the race is completely formed.

The apparatus for carrying out this method is designed so that both the matrix and the die have a cylindrical surface on which the tubular part bears with the surface area which forms in the finished bearing the surface area farthest from the beads. Both on the matrix and on the die, this cylindrical surface terminates in a circumferential groove with a circular contour whose radius corresponds to the radius of the outer contour of the beads to be produced and it is thus possible to produce different bead contours in a simple manner.

For the production of a thrust washers for an axial ball bearings, the method is modified to start from a thin-walled preformed part which consists of a ring-shaped thrust washers with axially directed collars at both edges. The latter is received in a matrix and a die moving in an axial direction toward it which comes in contact with the ends of the collars and effects the rolling of the collars to form the beads.

In the apparatus for effecting the method of the invention, the die has cylindrical surfaces which embrace the outer collar from the outside and the inner collar from the inside and these cylindrical surfaces in turn terminate in grooves with a circular contour whose radii correspond to the radii of the outer contours of the beads to be produced.

Finally, the application of the invention permits the assembly of a radial ball bearing in a simple manner with the races of the invention which can be done in various ways. In one case, a race can be produced as described above and the set of balls, whether with or without a cage, is then brought in contact with this race and held there by suitable measures. The ball can be "cemented", for example, in known manner with grease on the race and then the tubular part forming the second race is brought into the position relative to the first race which it must assume later in the finished bearing. In this position, the beads are finally formed in the above described apparatus and at the same time all bearing parts are assembled to form a self-contained unit.

In a modification of this method, one race can first be produced and then the ball set is brought into contact with this race and held there by with suitable measures, and subsequently the tubular part forming the second race which has already been formed at one end of the bead is brought into the position relative to the first race which it assumes in the finished bearing, and in this position the second bead is finally formed.

According to another modification of the method it is possible to form the beads first on one end of the tubular parts forming the races, then to bring both tubular parts into the position to each other which they assume in the finished bearing, subsequently to bring the ball set in contact with the beads and to hold it there, and to form the second beads in a common operation on both tubular parts.

The most expedient and by far most economical method finally consists in bringing the two tubular parts forming the races in their original form into the mutual position which they will assume in the finished bearing and to hold them there in the position which they assume in the finished bearing, and finally to form the beads at both axial ends on both tubular parts in a common operation.

Referring to the drawings:

FIG. 1 is a longitudinal section through an outer race of the invention while

Figure 1:
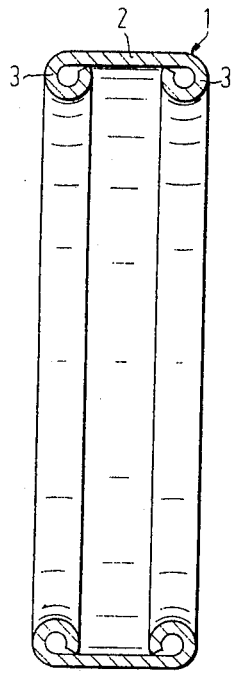

The outer race 1 in FIG. 1 consists of a cylindrical center part 2 and lateral beads 3 with a substantially circular shaped outer contour and the beads 3 are rolled in so far that they bear with their ends against the cylindrical center part whereby their stability is considerably increased. The inner race 4 in FIG. 2 consists in the same manner of a cylindrical center part 5 and the beads 6.

Figure 2:
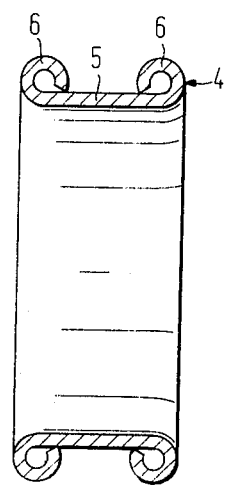
FIG. 2 is a longitudinal section through an inner race of the invention.

The differences between the outer race 1 and the inner race 4 consist, apart from their radial dimensions, in that the beads 3 of the outer race extend radially to the inside and the beads 6 of the inner race 4 extend radially to the outside. In the radial ball bearings of FIG. 3, the outer race 1 of FIG. 1 and the inner race 4 of FIG. 2 are joined with each other to form a unit with the interposition of balls 7.

Figure 4:
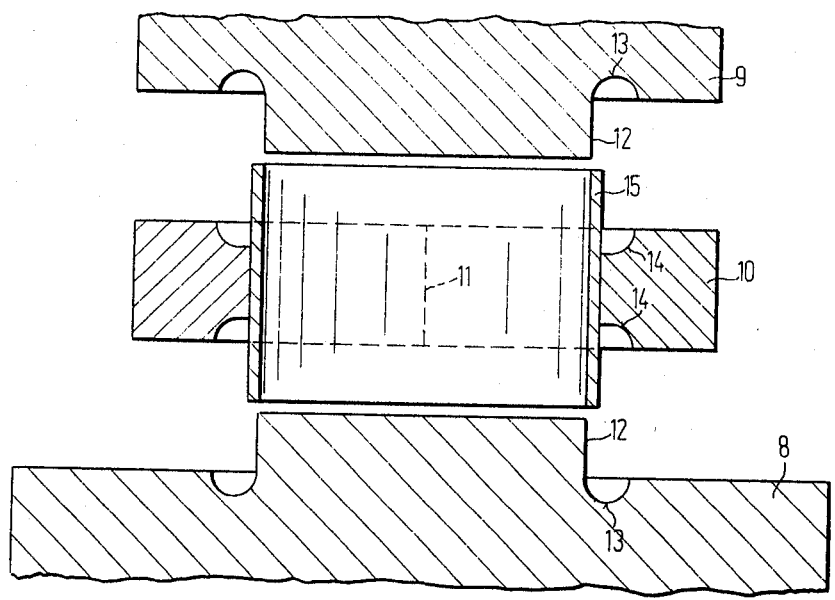
FIGS. 4 and 5 show an apparatus for the production of the inner race in two steps.
Figure 5:
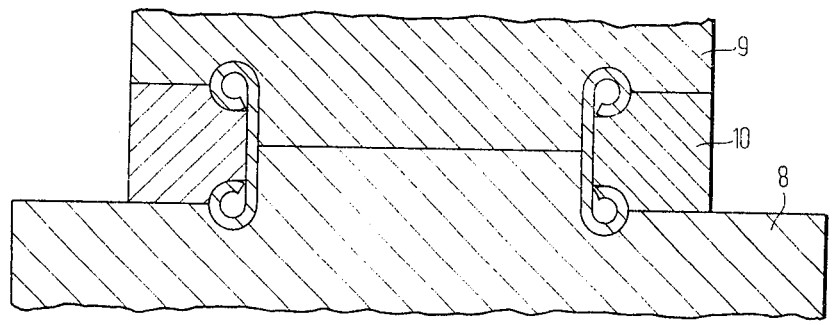

The production of individual races or of the entire bearing unit can be seen from FIGS. 4 to 7. FIGS. 4 and 5 show a tool consisting of a matrix 8, a die 9, and an intermediate ring 10 which is divided at the parting line 11 into two halves. Both the matrix 8 and the die 9 have cylindrical surfaces 12 of the same diameter which terminate in semi-circular grooves 13. Corresponding grooves 14 are provided in the end faces of the intermediate ring 10. The intermediate ring 10 receives in its bore the tubular part 15 from which the inner race is to be formed and the cylindrical surfaces 12 on the matrix 8 and die 9 are so dimensioned that they engage the bore of the tubular part 15 tightly. If the die 9 is now moved down toward the matrix, the final end state as represented in FIG. 5 is obtained and a finished inner race has been formed from the tubular part 15.

Figure 6:
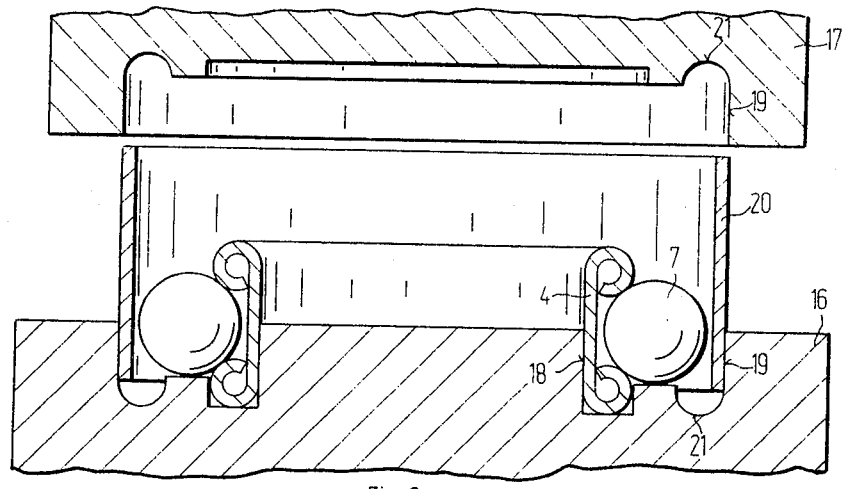
FIGS. 6 and 7 show an apparatus for the assembly of a radial ball bearings in two steps.
Figure 7:
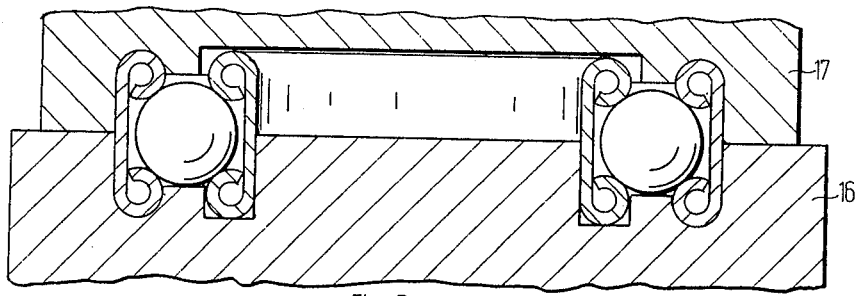

FIGS. 6 and 7 show the further steps by which a complete radial ball bearing can be produced starting from the inner race just obtained. The tool used consists again of a matrix 16 and a die 17. The matrix 16 receives the prefabricated inner race 4 on cylindrical surface 18 and the balls 7 bear against the beads of the inner race and are held there by suitable means, for example, grease. A tubular part 20 has been inserted into a second cylindrical surface 19 of matrix 16. The cylindrical surface 19 which corresponds to an identical surface 19 in die 17 terminates in a semi-circular groove 21. If the die 17 is now moved down toward matrix 16, the final end state, as represented in FIG. 7 is obtain in which the radial ball bearing is completely assembled. After the die 17 has been returned, it is only necessary to remove the matrix 16. The apparatus shown in FIGS. 6 and 7 shows that it is easily possible, by corresponding dimensioning of matrix 16 and die 17, to produce any desired bearing play in this deformation process.

Figure 8:
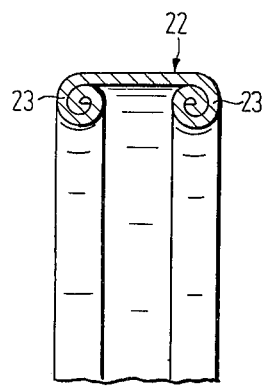
FIGS. 8 to 10 are longitudinal sections of modifications of the outer races of the invention.
Figure 9:
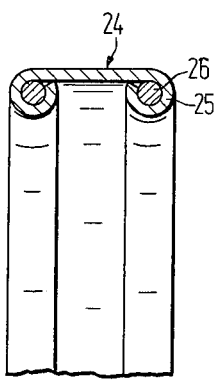
Figure 10:
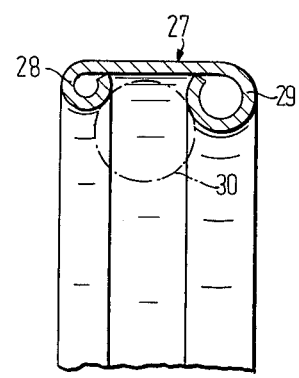

FIGS. 8 and 9 show variations of an outer race. In the outer race 22 represented in FIG. 8, the lateral beads 23 are rolled in several turns into the form of a spiral so that the bead cross-section is practically filled completely by the material. FIG. 9 shows an outer race 24 where a wire ring 26 is inserted into each bead 26 whereby the similar effect of the bead cross-section being practically filled completely by the material. The outer race 27 of FIG. 10 has at one end a bead 28 with a smaller cross-section, and at the other end a bead 29 with a larger cross-section. FIG. 10 shows that the ball 30, represented in broken lines, touches the beads at points which are arranged in a different distance from the bearing axis.

Figure 11:
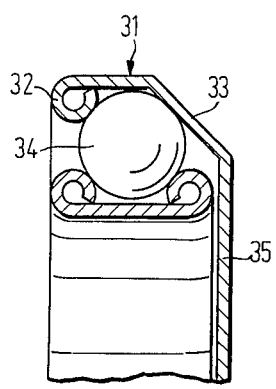
FIGS. 11 to 18 are longitudinal sections through other modifications of radial ball bearings.
Figure 12:
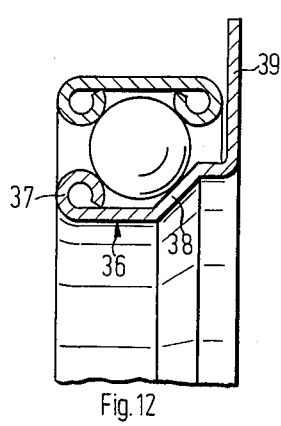
Figure 13:
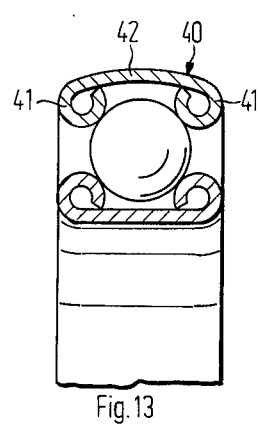

FIG. 11 shows a completely assembled radial ball bearing wherein an outer race 31 is used which has at one end a bead 32, but at the other end passes over into a closed bottom 35 by means of a conical surface 33 against which the ball 34 rests. FIG. 12, on the other hand, shows a modification wherein the outer race has the usual form while the inner race 36 has at one end a bead 37 and passes over at the other end by means of the conical surface 38 into the radially directed flange 39 which flange may serve to fasten the bearing on a element. The radial ball bearing of FIG. 13 differs from that in FIG. 3 in that the outer race 40 has a convex region 42 between the beads 41. By means of this region 42, this outer race can adjust itself to a certain extent in a cylindrical housing bore.

Figure 14:
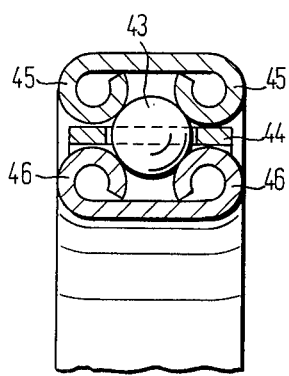
Figure 15:
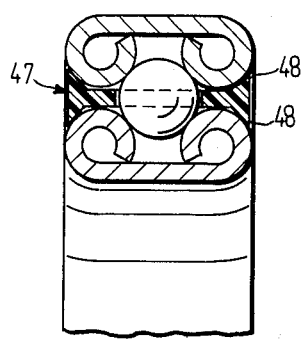
Figure 16:
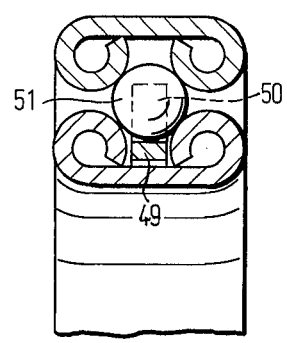
Figure 17:
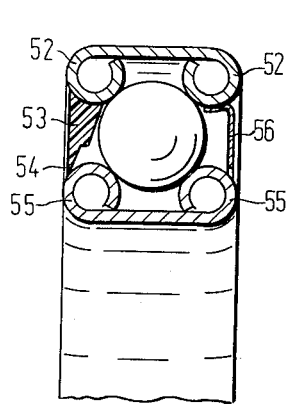

In the radial ball bearing of FIG. 14, the balls 43 are arranged in a cage 44 which is designed as a simple cylindrical sleeve. Cage 44 is guided between the beads 45 of the outer race and the beads 46 of the inner race. In the modification of FIG. 15, a plastic cage 47 is used which bears at its ends with sealing washers 48 against the beads of the races. In the radial ball bearing of FIG. 16, a different cage is used compared to the bearing in FIG. 14 which cage consists of a ring-shaped disk 49 which extends with radially directed webs 50 between the balls 51. The bearing of FIG. 17 shows two sealing means. On the left side of the figure, a plastic element 53 has been snapped on to the bead 52 of the outer race which bears by a washer 54 slidingly against the bead 55 of the inner race. On the right side of FIG. 17, a metal element 56 has been snapped on to the bead 52 of the outer race which forms a sealing gap with the bead 55 of the inner race.

Figure 18:
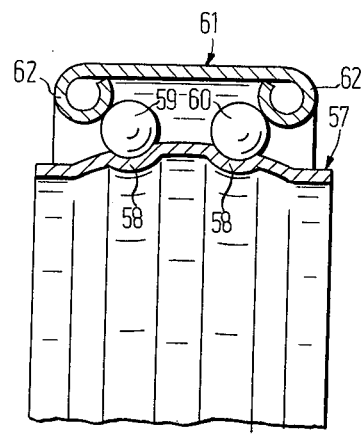

FIG. 18 shows a double row, self-aligning ball bearing wherein inner metal race 57 receives the rows of balls 59 and 60 in two spaced ball grooves 58. To this inner race 57 corresponds an outer race 61 whose beads are in contact with one of the two rows of balls 59 and 60 and because each bead 62 touches only one row of balls 59 and 60 in one point, the outer race 61 can move to a certain extent relative to the innter race 57.

Figure 19:
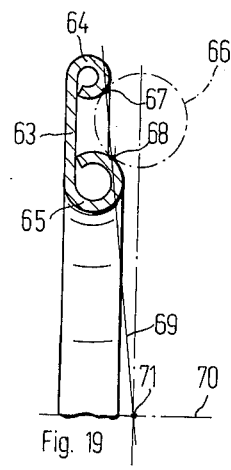
FIG. 19 is a longitudinal section through an axial thrust washers of the invention and FIGS. 20 and 21 are longitudinal sections through an apparatus for the production of axial thrust washers in two steps.

FIG. 19 shows an axial thrust washers which consists of radially directed part 63 having at the outer end a bead 64 and at the inner end a larger bead 65. These beads touch the ball 66, represented in broken lines at points 67 and 68, which lie on the straight line 69 which the bearing 70 intersects in the center 71 of the bearing. This measure provides clear rolling conditions for the balls 66.

Figure 20:
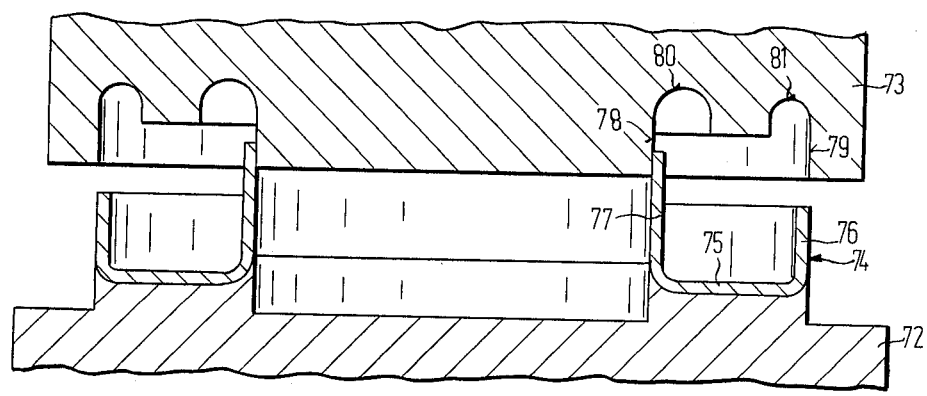
Figure 21:
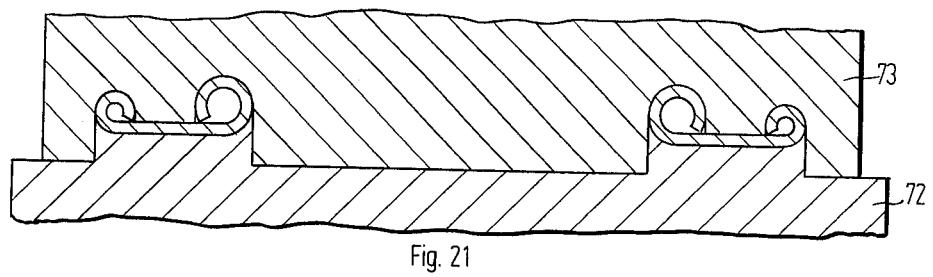

FIGS. 20 and 21 show the apparatus for the production of an axial thrust washers of FIG. 19. The apparatus consists of matrix 72 and die 73 and on the matrix 72 is placed the prefabricated part 74 which consists of the ring-shaped thrust washers 75 with axially directed collars 76 and 77. The die 73 has cylindrical surfaces 78 and 79 which correspond with the collars 77 and 76 and which terminate in semi-circular grooves 80 and 81 which have different radii corresponding to the size of the desired beads. When die 73 is moved down toward matrix 72, the end state is finally reached as represented in FIG. 21 in which the finished thrust washers is formed. After lifting die 73, it can be removed from matrix 72.

Figure 3:
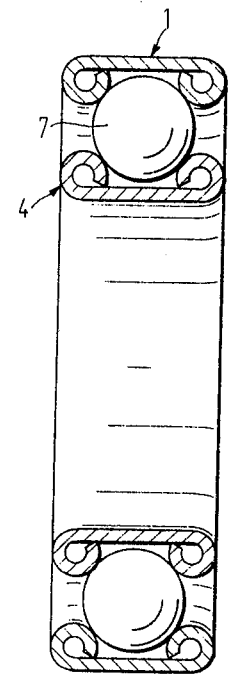
FIG. 3 is a longitudinal section through a radial ball bearing with races of FIGS. 1 and 2.
Figure 22:
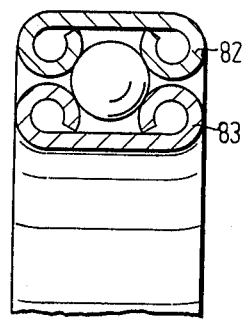
FIG. 22 is a longitudinal section through a radial ball bearing.

The radial ball bearing of FIG. 22 is a modified embodiment of the bearing of FIG. 3 wherein the beads 82 of the outer race and the beads 83 of the inner race are so dimensioned that they approach each other so that a narrow gap remains between them which is sufficient in many cases to seal the bearing.

Figure 23:
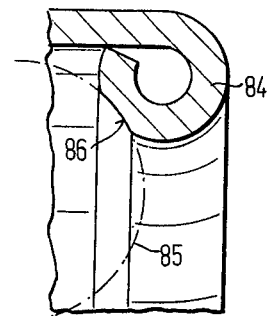
FIG. 23 is a partial longitudinal section through an outer race.

FIG. 23 shows in detail on an enlarged scale a bead 84 which has in the area in which ball 85 (represented in broken lines) rolls a deformation 86 which can correspond to the contour of the ball as in the present example. This deformation can be produced by cutting shaping, but also by non-cutting shaping, for example, by rolling.

Figure 24:
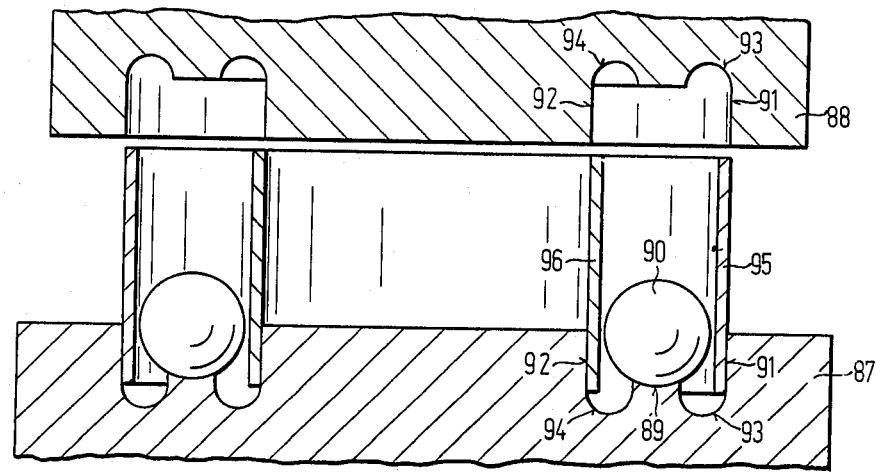
FIGS. 24 and 25 are longitudinal sections through an apparatus for the assembly of a radial ball bearing in two steps.
Figure 25:
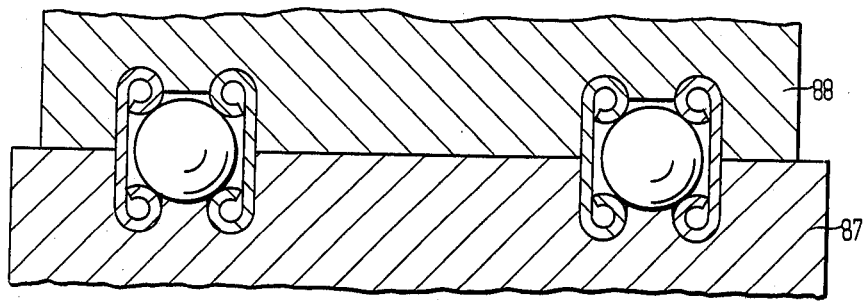

FIGS. 24 and 25 finally show another method for assembling a radial ball bearing which differs from the method illustrated in FIGS. 6 and 7. For carrying out this method as shown in FIG. 24, a matrix 87 and a die 88 are used and the matrix 87 has in a recess a circumferential groove 89 into which balls 90 can be inserted. The groove 89 is designed so that the balls maintain the provided position and both matrix 87 and die 88 are provided with corresponding cylindrical surfaces 91 and 92 which terminate in semi-circular grooves. At the start of the method, tubular parts 95 and 96 are inserted into the matrix and bear then on the cylinder surfaces 91 and 92. Subsequently, die 88 is pressed down toward matrix 87 and the end state is finally reached as represented in FIG. 25 where the tubular parts 95 and 96 are formed into a finished outer and inner race, and the radial ball bearing is assembled as a unit. After die 88 is returned, matrix 87 can be removed from the bearing.

Finally it should be pointed out that such bearings not only have the above-mentioned advantage that the bearing play can be exactly determined during the production, but is is also possible in the installation of a bearing to achieve a reduction of the bearing play by bringing one or both races under a certain axial initial stress so that the two beads of a race are pressed slightly against each other by which it is possible to obtain a reduction of the bearing play up to a desired initial stress.

Various modifications of the products, methods and apparatus of the invention may be made without departing from the spirit or scope thereof and it should be understood that the invention is intended to be limited only as defined in the appended claims.

We claim:

1. A race for radial ball bearings comprising a single thin-walled tubular element having two axial ends and provided on at least one axial end with a rolled bead with a substantially circular outer contour on which the balls of the bearing roll.

2. A race of claim 1 wherein beads are provided at both axial ends of the race and the distance between the beads is adapted to the ball diameter so that the balls of the bearing will only contact the bead surfaces.

3. The race of claim 2 wherein the two beads have different diameters.

4. The race of claim 1 wherein the beads are finished in the area wherein the balls roll by shaping.

5. The race of claim 1 wherein a wire ring is rolled into the bead to substantially fill the cross-section of the bead.

6. The race of claim 1 wherein the bead is rolled in several turns into spiral form whereby the bead cross-section is substantially filled.

7. The race of claim 1 wherein the tubular element is provided with a closed end opposite to the beaded end.

8. The race of claim 1 wherein the tubular element is provided with a radially outwardly directed flange at the end opposite to the beaded end.

9. The race of claim 7 wherein a conical surface is provided at the transition from the tubular portion to the closed end on which the balls roll.

10. The race of claim 7 wherein a conical surface is provided at the transition from the tubular portion the flange.

11. The race of claim 1 wherein the area of the tubular element adjacent the bead is deformed to provide a convex contour in the surface remote from the beads.

12. A radial ball bearing comprised of a unit of an outer race of claim 1 with radially inwardly directed beads, an inner race of claim 1 with outwardly directed beads and a row of balls therebetween.

13. A bearing of claim 12 wherein the balls are accommodated in a cage in the form of a cylindrical sleeve guided on at least one end by the beads of the races.

14. A radical ball bearing of claim 13 wherein the cage engages the beads with a minimum of radial play to form sealing gaps at this point.

15. A radial bearing of claim 12 wherein the balls are accommodated in a cage in the form of a flat disk with radially directed webs extending between successive balls.

16. A bearing of claim 12 wherein the beads of the inner and outer races are dimensioned to form a narrow sealing gap therebetween.

17. A bearing of claim 13 wherein the cage is made of plastic and bears at its ends against the beads of the inner and outer races to form a sliding seal under initial stress.

18. A bearing of claim 12 wherein the gap between the beads of the inner and outer races is bridged by a ring-shaped element secured on the bead of one of the races which cooperates with the bead of the other race to form a seal.

19. A method for producing the race of claim 1 comprising placing a thin-walled tubular element between a matrix and a die, said matrix and die being provided with semi-circular grooves in the area of the tubular element and moving the die and matrix axially toward each other whereby at least one end of the tubular element is formed into a bead with a substantially circular outer contour.

20. A method of assemblying a radial ball bearing of claim 12 comprising producing an inner race in the form of a tubular element with radially outwardly directed beads, temporarily contacting a row of balls with the inner race, positioning a tubular element for the outer race relative to the first race in the finished bearing and forming radially inwardly directed beads on the ends of the tubular element, all the said beads having a substantially circular outer contour.

21. A method of assembling a radial ball bearing of claim 12 comprising producing an inner race in the form of a tubular element with radially outwardly directed beads on the ends thereof, temporarily contacting a row of balls with the inner race, positioning a tubular element with a radially inwardly directed bead on one end relative to the inner race for the outer race in the finished bearing and forming a radially inwardly directed bead on the other end of the tubular elements, all the said beads having a substantially circular outer contour.

22. A method of assembling a radial ball bearing of claim 12 comprising producing an inner race and an outer race in the form of tubular elements having at one end thereof a radially outwardly directed bead and a radially inwardly directed bead respectively, positioning the two races in their relative positions in the finished bearing placing the balls between the two races and forming on the other ends of the races corresponding beads, all the said beads having a substantially circular outer contour.

23. A method of assembling a radial bearing of claim 12 comprising positioning two tubular elements which will form the inner and outer races relative to each other as in the finished bearing, placing the balls between the elements and simultaneously forming on the ends of the inner race radially outwardly directed beads and the outer race radially inwardly directed beads, all of the said beads having a substantially circular outer contour.

24. An apparatus for producing the race of claim 1 comprising a matrix and a die with a cylindrical portion on which a thin-walled tubular element having two axial ends may bear, the cylindrical surface of the die terminating on at least one end in a circumferential semi-circular groove with a radius corresponding to the substantially circular outer contour of the rolled bead to be produced on at least one of the axial ends of the tubular element.

25. A thin-walled thrust washer for axial ball bearings comprising a ring-shaped metal plate provided with two edges and having at its two edges rolled beads with a substantially circular outer contour.

26. An apparatus for producing the thrust washer of claim 25 comprising a matrix capable of accommodating a thin-walled ring-shaped metal disk provided with 2 axially extending collars and a die axially moveable towards the matrix and provided with cylindrical surfaces which engage the outer collar from the outside and the inner collar from the inside, said cylindrical surfaces terminating in circumferential semi-circular grooves with different radii corresponding to the desired outer contour of the beads to be formed whereby their contact points with the balls lie on a straight line which intersects the bearing axis in the bearing center.

27. A method for producing a thrust washer of claim 25 comprising placing a thin-walled ring shaped disk with axially extending collars at both edges between a matrix and a die, said die being provided with a circumferential semi-circular grooves and axially moving the die towards the matrix whereby the collars are rolled into beads by the said grooves.

28. In an axial ball bearing, at least one thrust washer with two edges provided with a bead wherein the two beads have different diameters whereby their contact points with the balls lie on a straight line which intersects the bearing axis in the bearing center.

29. A radial ball bearing comprising an inner race provided with two ball grooves spaced an axial distance from each other, a row of balls in each groove, a thin-walled tubular outer race provided at both ends with beads with a substantially circular outer contour whereby the balls of each row contact only one bead of the outer race.

* * * * *